United States Patent [19]

Paul, Jr.

[11] 4,065,753

[45] Dec. 27, 1977

[54] ELECTROMAGNETICALLY RESPONSIVE PROJECTILE AND SYSTEM FOR DETECTING SAME

[75] Inventor: Fred R. Paul, Jr., Burnsville, Minn.

[73] Assignee: Minnesota Mining & Manufacturing Company, St. Paul, Minn.

[21] Appl. No.: 504,060

[22] Filed: Sept. 9, 1974

[51] Int. Cl.² .................. A61M 31/00; G01S 9/02
[52] U.S. Cl. ..................... 340/152 T; 325/102; 325/115; 128/2 P; 119/1; 102/92
[58] Field of Search ............... 340/152 T, 280; 343/6.5 R, 6.8 R; 325/8, 102, 115, 118; 128/2 P, 2.1 A, 217, 260; 102/92, 92.1, 92.7; 119/1

[56] References Cited

U.S. PATENT DOCUMENTS

| | | | |
|---|---|---|---|
| 2,511,409 | 6/1950 | Mayberry | 325/8 |
| 2,896,204 | 7/1959 | Gille | 343/6.8 R |
| 3,035,262 | 5/1962 | Vantine, Jr. | 343/6.5 |
| 3,229,684 | 1/1966 | Naguno et al. | 128/2 |
| 3,432,852 | 3/1969 | Arnold | 343/6.5 R |
| 3,713,133 | 1/1973 | Nathans | 340/280 |
| 3,790,948 | 2/1974 | Ratkovich | 343/113 R |
| 3,810,172 | 5/1974 | Burpee et al. | 343/5 PD |
| 3,893,111 | 7/1975 | Cotter | 343/6.5 R |
| 3,948,263 | 4/1976 | Drake, Jr. et al. | 102/92 |

Primary Examiner—John W. Caldwell, Sr.
Assistant Examiner—Joseph E. Nowicki
Attorney, Agent, or Firm—Cruzan Alexander; Donald M. Sell; William B. Barte

[57] ABSTRACT

A projectile is provided having contained therein a passive electromagnetically responsive device such as a tuned inductive-capacitive circuit. The circuit is preferably detected by stimulating oscillations at the resonant frequency of the circuit by a pulsed electromagnetic field. The projectiles are desirably used to enable remote tagging and detection and/or identification of objects including livestock.

11 Claims, 7 Drawing Figures

ELECTROMAGNETICALLY RESPONSIVE PROJECTILE AND SYSTEM FOR DETECTING SAME

BACKGROUND OF THE INVENTION

1. Field of the Invention

This invention relates to systems enabling the remote detection and identification of objects.

2. Description of the Prior Art

Numerous systems utilizing some form of electromagnetically responsive tag or market affixable to an object to be detected and/or identified are known in the art. Such tags are known to include ferromagnetic materials wherein the magnetic field resulting from the magnetization of the material is directly sensed or wherein the effect of the material on an external field is sensed. See, for example, U.S. Pat. Nos. 3,292,808 (Trikilis) and 3,665,449 (Elder and Wright). Tags are also known to include a variety of electrical circuits which, if active, i.e., containing an internal source of power, may produce an electromagnetic field which is remotely sensible. See, for example, U.S. Pat. Nos. 3,582,931 (Nawrocki) and 3,493,955 (Minasy). Similarly, passive tags, i.e., those not having an internal source of power and which are thus incapable of directly producing an electromagnetic field, are capable of responding to an external electromagnetic field in a manner enabling remote electrical detection. Typically, one such general type of passive electrical circuit comprises some form of a tuned inductive-capacitive circuit such that when stimulated by an external electromagnetic field the resonant frequency of the tuned circuit can be detected. Various schemes for so stimulating and detecting LC resonant tags are, for example, set forth in U.S. Pat. Nos. 2,693,525 (Kendall), 2,910,579 (Jones and Currie), 3,299,424 (Vinding), 3,406,391 (LeVon), 3,624,631 (Chomet), 3,713,102 (Martin) and 3,740,742 (Thompson).

In such prior art identification and/or detection systems, the manner of attachment of the tag to the object to be identified and/or detected has been somewhat incidental. Such systems have required that the object be directly handled in order to affix the tag to the object such as by mechanical fasteners, adhesives, insertion of the tag into the object and the like.

Systems are also known wherein materials such as biologically active chemicals have been remotely delivered to objects via some type of projectile containing the material. Thus, for example, animals may be anethestized via a syringe dart or bullet filled with the appropriate anethetic. The latter method of application is disclosed in U.S. Pat. Nos. 979,993 and 3,616,758.

SUMMARY OF THE INVENTION

The present invention comprises a projectile having a passive electromagnetically responsive device included therein. The device is capable of being stimulated by an external electromagnetic field to enable the remote detection of the projectile. It has not been known heretofore to include passive electromagnetically responsive device in a projectile to enable such subsequent remote detection. Indeed, where electrical circuits have in the past been used with projectiles, such uses have been for ordinance purposes to facilitate guidance or detonation of the projectile. Inasmuch as such projectiles are intended to self-destruct upon impact, that destruction would be counter to any purposeful inclusion of a passive device to enable subsequent detection.

Where identification and/or detection enabling tags including passive electromagnetically responsive devices have been used in the past, such tags have been attached to the objects to be detected or identified by some mechanical means requiring direct handling of or direct contact with the object. In certain conditions such direct handling is not desired. For example, bulk handling of livestock demands that the animals be processed as rapidly as possible, hence there is a need to enable the remote tagging and subsequent detection and identification thereof. The present invention enables such remote detection and identification, yet does not require the objects such as livestock to be directly handled to either affix or detect the tag. The tags in the form of a projectile are propelled by a suitable means, such as an air gun, toward the object to be tagged to cause it to become attached thereto. The size, shape, mass and conformability of the projectile as well as its terminal velocity will, therefore, need to be controlled by known ballistic considerations to effect the desired attachment. In the event livestock is to be so tagged, the preferred projectile is designed such that upon delivery it pierces the hide to become lodged therebelow without being physically ruptured and without damaging the passive responsive component. Similarly, if fur or hair covered animals are to be so tagged, the projectile can be designed to facilitate entanglement in the hair or fur to effect enlodgment. In contrast, it is equally within the scope of the invention that the object to be tagged may have a relatively impermeable, smooth outer surface to which the projectile must be attached. In such an event, the projectile is designed to become adhered or otherwise affixed to that surface upon impact while yet not damaging the passive responsive component.

Once affixed, the projectiles are thereafter detected within an interrogation zone by producing an electromagnetic field therein and by sensing for an electromagnetic response characteristic of the presence of the projectile. The term "electromagnetic field" as used in this specification should be understood to comprise both a field produced by radiation from an antenna system and an inductive field from a coil system.

In a preferred embodiment, the projectile is constructed of an electromagnetically permeable body within which the responsive device is mounted. Such a body would desirably be formed of a material having an electrical resistivity of not less than $10^6$ ohm-cms and a relative permeability of approximately unity such that the interrogating electromagnetic fields will readily pass there through. The responsive device is preferably an inductive-capacitive circuit resonant at a predetermined frequency and having a Q-factor of not less than 30. The projectile is sensed by subjecting it to a pulsed electromagnetic field whereby the rapid change of field at the termination of each pulse produces in the circuit a damped oscillation at the predetermined frequency, which oscillation is sensed in a remotely located receiver. One such preferred responsive device and a system for its use is the invention of Richard R. Lemberger and is the subject of a co-pending patent application filed simultaneously herewith, U.S. Ser. No. 504,059.

DESCRIPTION OF THE PREFERRED EMBODIMENTS

Figure 1:
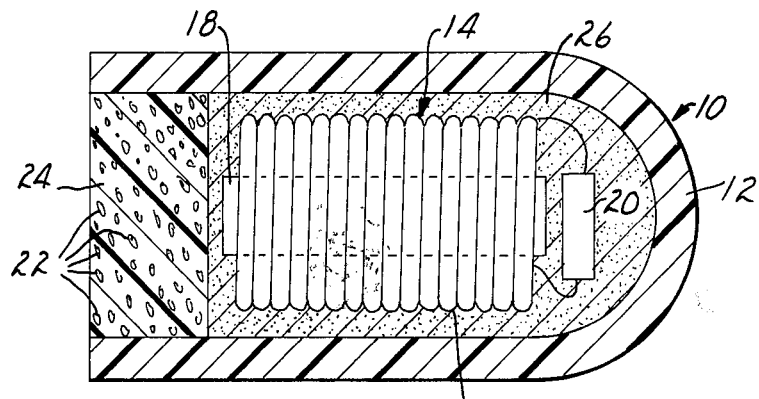
FIG. 1 is a sectional view of a projectile according to the present invention.

As outlined in the background of the invention hereinabove, there are many known varieties of remotely detectable electromagnetically responsive devices, all of which are useful in the present invention so long as the respective device can be included in a projectile. Thus, for example, the projectile of the present invention preferably includes a passive electromagnetically responsive device, i.e., one in which there is no internal source of electrical power. Such a device may, for example, be an element having no resonance characteristics, but which has non-linear characteristics such that upon interrogation by an oscillating electromagnetic field detectable harmonics of the oscillating electromagnetic field are generated. Such non-linear elements are generally magnetic materials, conductive metals or solid state diodes.

Illustrative systems utilizing non-linear magnetic elements are disclosed in U.S. Pat. Nos. 3,292,080 (Trikilis), 3,631,442 (Fearon) and 3,665,449 (Elder & Wright). In such systems an electromagnetic field oscillating at a predetermined frequency is generated within an interrogation zone such that when an element is present within the zone, harmonics of the predetermined frequency are generated. Receivers including sense coils and associated electronic detectors are positioned proximate the zone to enable detection of the harmonics thereby enabling the detection and/or identification of the markers.

In a similar fashion, the electromagnetically responsive devices may comprise electrically non-linear elements such as diodes. See, for example, U.S. Pat. Nos. 2,607,004 (Harris), 3,518,546 (Augenblick) and 3,711,848 (Martins). In a manner analogous to that utilized with the magnetic systems described hereinabove, an electromagnetic field oscillating at a predetermined frequency is produced within an interrogation zone such that the diodes generate harmonics of the predetermined frequency, which harmonics are then detected with conventional electronic sensors.

A particularly preferred embodiment of the projectile of the present invention includes a passive inductive-capacitive tuned circuit resonant at a predetermined frequency. Such circuits are known to be detectable by a variety of different types of interrogating fields. For example, in U.S. Pat. No. 2,774,060 (Thompson) a tag containing a circuit resonant at the exact frequency of an interrogating electromagnetic wave is provided. The tag is detected as a change in the current in a transmitting antenna resulting in the loading down of the antenna circuit due to the presence of the resonant circuit. Rather than sensing for such a loading at a single predetermined frequency, U.S. Pat. No. 2,693,525 (Kendall) discloses a transmitter, the output of which is swept through a range of frequencies. A marker resonant at a predetermined frequency within the range of frequencies in an interrogation zone is detected by the absorption of energy at that predetermined frequency. Systmes such as the last two described suffer the disadvantage that the resonant charcteristics of the marker must be sensed in the presence of the transmitted signal having the same frequency. More complex systems embodying the basic concept of a resonant LC circuit have thus been devised to overcome such limitations. For example, in U.S. Pat. Nos. 2,910,579 (Jones and Currie), 3,406,391 (LeVon) and 3,493,955 (Minasy) at least two resonant circuits are provided within each marker. In such systems, a first LC circuit is resonant at the transmitted frequency to absorb energy from the transmitted signal, which energy is then coupled through a diode to a second LC circuit resonant at a second and different frequency. The diode thus rectifies the energy received in the first LC circuit and provides power to stimulate oscillations at the second resonant frequency which oscillations are then detected by conventional receivers. A variety of modifications of these techniques including means for deactivating the markers and for providing specific codes enabling identification as well as detection of objects to hich the markers are attached are similarly known in the prior art.

Another general type of interrogation of an LC resonant circuit is disclosed in U.S. Pat. Nos. 2,896,204 (Gille), 3,713,102 (Martin) and 3,740,742 (Thompson). In the systems disclosed in these patents a pulsed electromagnetic field characterized by a sharp cutoff is provided within an interrogation zone. The sharply cutoff electromagnetic field stimulates oscillations in a marker having a predetermined resonant frequency, which frequency is then detected with conventional electronic receiving means.

It is intended that all systems such as those both explicitly and inferrentially discussed hereinabove which disclose electromagnetically responsive devices such as are suitably contained within a projectile are intended to be within the scope of the present invention.

The projectiles of the present invention are particularly adapted to be implanted into living animal bodies by ballistic means such as by launching or "shooting" the projectiles from a convenient distance with small arms or other launching devices powered by expanding gas means such as explosive charges or compressed gases, preferably air. When properly launched, the projectiles will penetrate a living animal body in a non-lethal manner and come to rest within the body. The depth of penetration of the projectile can be controlled by balancing the relationship between the mass of the projectile and the velocity of the projectile at impact. The design of the projectile can vary and conventional designs useful herein are known in the art. The projectile design can be varied to achieve the desired degree of penetration into the body as well as to achieve the desired performance with respect to a wide range of impact velocities and a wide range of animals. Many texts are available to those skilled in the ballistics art which teach operative designs for the ogival and other portions of the projectile. See, for example, Hayes, "Elements of Ordnance", John Wiley and Sons, Inc., New York. It is generally preferred that the projectile have an elongated body with a tapered nose portion which may be rounded as shown in the accompanying drawings, conical or the like. A projectile design similar to that shown in the FIG. 1 of the drawing has been found effective for the intramuscular implanation of a 0.25 caliber projectile into the flanks of beef cattle at a distance of about 20 to 40 feet. The projectile should be capable of penetrating a sufficient distance into the body tissue to ensure passive enlodgment while allowing adequate response to external fields. The point at which entry into the living body is effected can readily be determined for maximum effectiveness utilizing minimum force.

The preferred projectile 10 shown in FIG. 1 comprises a body portion 12 and an electromagnetically responsive device 14 contained therein. The device 14 comprises a high Q tuned inductive-capacitive circuit including a coil 16 on a high permeability ferrite core 18, and a capacitor 20 connected in parallel with the coil 16. The electrical characteristics of such an inductive-capacitive tuned circuit are conventional, however, additional physical restraints are imposed on the circuits due to the environment in which it is used. Since the projectile is to be desirably used to facilitate identification of livestock, the physical size of the device 14 is preferably sufficiently small to facilitate inclusion of the circuit in a projectile having outer dimensions enabling the non-lethal penetration of the projectile a short distance into such livestock. Accordingly, the projectile is preferably designed to have an external diameter not greater than 0.3 inches (7.5 mm) (i.e., 0.25 caliber) and a length not greater than 0.75 inches (19 mm). A projectile length of 0.5 inches (12.7 mm) is particularly desired. In order to fit within a cavity within such a projectile, the coil therefore desirably has an outer diameter of less than 0.2 inches (5.0 mm) and a length of less than 0.3 inches (7.5 mm). The circuit must also be constructed and mounted within the cavity to withstand physical shock occurring upon impact of the projectile such as by being cast in epoxy 26. The coil may alternatively be wound directly on the core 18 or wound on a removable bobbin and the ferrite core thereafter inserted. A particularly desirable material for use as the ferrite cores has been found to be a barium ferrite composition such as types 26 and 27 A obtained from the Stackpole Carbon Company, Inc., St. Mary's, Pa.

In order to complete the inductive-capacitive circuit 14, a capacitor 20 is connected in parallel with the coil 16. Such a capacitor 20 is desirably miniaturized to facilitate the inclusion of the circuit 14 into the projectile 10. A particularly desired capacitor has been found to be a ceramic chip element, the leads of which may be directly bonded to the coil 16.

Inasmuch as the inductive-capacitive tuned circuit 14 is to be responsive to an external magnetic field to enable the remote detection of the projectile, the body 12 must be constructed so as not to prevent such a response. Accordingly, if the body 12 is formed of a conventional shell casing, i.e., copper, brass or the like, it will be desirable that the open end of the body be such as not to substantially absorb radiation as may enter through the open end to interact with the device 16 within. Because such a construction nonetheless limits the directional sensitivity of the projectile, it is preferred that the body 12 be formed of an electromagnetically permeable body to facilitate the resonse to external electromagnetic fields. Such a body is desirably formed of a material having a resistivity of not less than $10^6$ ohms-cm and a relative permeability of approximately unity, such characteristics being common in conventional plastic materials such as polymethylmethacrylate, polypropylene, etc.

It has been found that a particularly desired frequency range within which the stimulated oscillations of the circuit are most readily detectable is between 150–400 kHz, particularly at about 330 kHz. Accordingly, the coil 16 is preferably constructed to have between 300–700 turns, such that when a capacitor having a capacitance value between 50–500 pf is added, the desired resonant frequency is achieved. One preferred construction has been found to include a coil having 575 turns of #38 AWG (American Wire Gage) enameled copper wire on a 0.075 inch (1.9 mm) diameter by 0.25 inch (6.4 mm) long ferrite core, resulting in an inductance of about 2.2 mHy, and a capacitor of approximately 80 pf. The Q of the resultant circuit was about 50. As described in more detail hereinbelow, it has also been found preferable to detect the projectile by sensing for such oscillations at the resonant frequency of the device 14 as persist after a pulsed electromagnetic field is terminated. To ensure sufficient persistance of such oscillations, it is desirable that the device 14 has a resonance Q-factor of not less than 30 and preferably as high as is practical. Typically, Q-value of about 50 have been found to be readily achieved with constructions of the type just described.

While passive electromagnetically responsive devices are generally preferred for use in the projectiles of the present invention, it is also intended to be within the scope of the present invention that active responsive devices may similarly be included within the projectile. Such projectiles would preferably be constructed of a plastic material.

For certain uses it is desired that the projectile 10 be shaped to define a cavity therewithin which is adapted for additionally containing materials which may subsequently be released from the cavity. In FIG. 1 such a cavity is shown filled with a material 22 inert binder 24, which material may, for example, be biologically active, or may be releasable dyelike material to facilitate medical treatment and/or marking as well as tagging the desired object.

Figure 2:
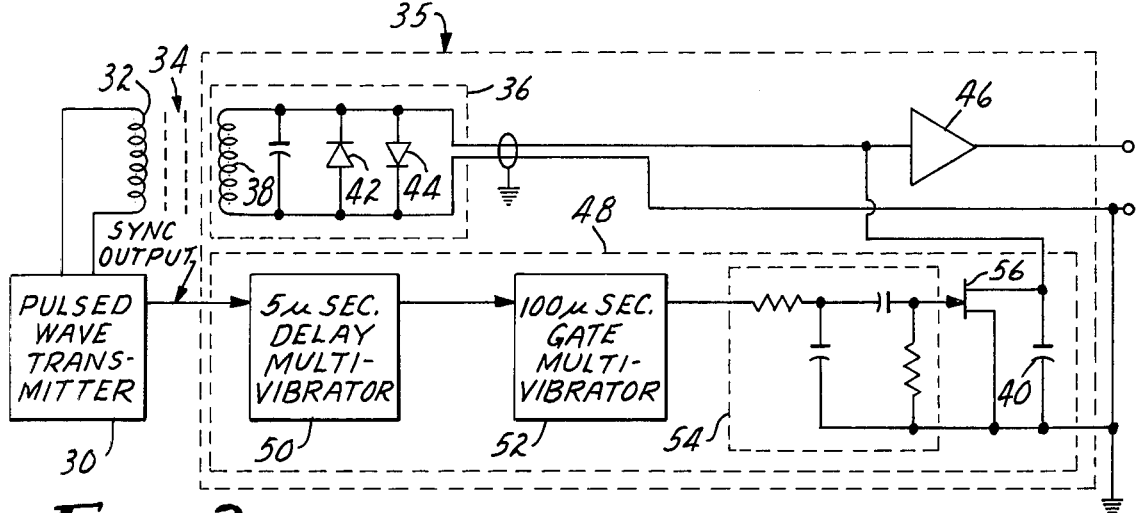
FIG. 2 is a schematic view of an embodiment for remotely detecting the projectile shown in FIG. 1.
Figure 3A:
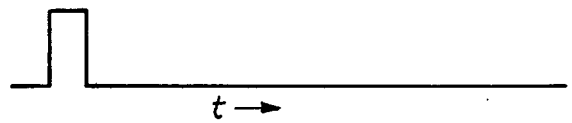
FIGS. 3A through 3E are a series of wave forms showing representative signals resulting upon the detection of a projectile in the system shown in FIG. 2.
Figure 3B:
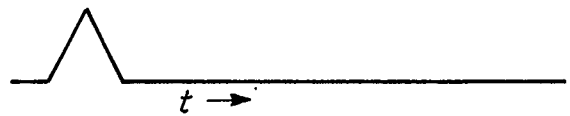

A preferred system for detecting a high Q tuned resonant circuit such as just described is shown in FIG. 2. A pulsed wave transmitter 30, such as the Model 350 pulse generator manufactured by Velonic, Inc., Santa Clara, California, and capable of delivering a peak power of 30 kw for a short duration of time, is used to drive a transmitting coil 32, which may desirably consist of a 30 inch (762 mm) diameter loop of three turns of #12 AWG wire. A train of 700 V pulses 1 μsec long spaced 10 msec apart such as shown in FIG. 3A is thus produced. The inductive lag produced by the coil 32 results in a pulsed current as shown in FIG. 3B, having peak currents of about 45 amps. As is shown in FIG. 3B, the field completely collapses in less than 1 μsec after termination of the voltage pulse. The current pulse results in a pulsed electromagnetic field within the interrogation zone 34 having a wide energy spectrum such that energy at the same frequency as the resonant frequency of the device 14 is absorbed. The voltage pulse width is preferably less than one-half the period associated with the highest resonant frequency to be detected.

Figure 3C:
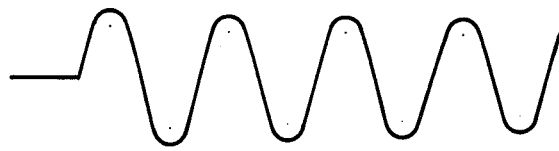

When a LC tuned resonant circuit having a Q value of about 50 and a resonant frequency of about 330 kHz was present in the zone 34, it was stimulated into oscillations at the resonant frequency. The oscillations are depicted in FIG. 3C, and could be detected up to 80 μsec following each interrogation pulse.

Figure 3D:
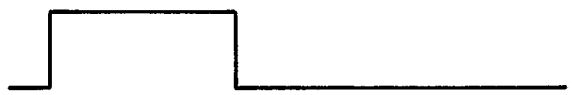
Figure 3E:
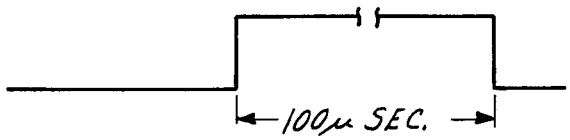

FIG. 2 further shows a preferred receiver 35 for detecting such oscillations subsequent to the termination of each transmitted pulse, which receiver 35 comprises an antenna section 36 tuned to the resonant frequency of the resonant device, a similarly tuned narrow band amplifier 46, and gating circuitry 48 synchronized to the transmitter 30 to enable operation of the receiver only when the transmitter is off. The antenna section 36 comprises a coil 38 containing 20 turns of wire, 15 inches (381 mm) in diameter. The capacitor 40 in parallel with the coil 38 is provided to tune the antenna section 36 to the desired frequency. Diodes 42 and 44 are provided to limit peak excursions of the voltage induced during interrogations to prevent overloading. The antenna section 36 is coupled to the narrow band tuned amplifier 46. The gating circuitry 48 essentially shorts out the antenna section when the receiver is not used. The circuitry 48 contains a 5 μsec delay monostable multivibrator 50 which is triggered by a synchronized pulse from the transmitter 30. Thus for each transmitted pulse shown as FIG. 3A, a synchronized pulse is also produced to switch the delay multivibrator 50 into a second state for 5 μsec, as shown in FIG. 3D, thereby allowing energy induced into the antenna during the transmitting pulse period to dissipate. The output of the delay multivibrator 50 is coupled to a 100 μsec monostable gate multivibrator 52 to switch the gate multivibrator 52 into a second state for a duration extending for a period of 100 μsec after the end of the initial 5 μsec delay such as shown in FIG. 3E. The output of the gate multivibrator 52 is coupled through a RC integrator circuit 54 to a solid state switch 56, such as a U291 field effect transistor manufactured by Siliconix, Inc., Santa Clara, California, connected across the input of the amplifier 46 to turn off the transistor 56 and hence remove the short only during the 100 μsec period. The integrator circuit 54 reduces switching spikes which could cause ringing in the antenna section and amplifier. If desired, additional circuits may be provided to decrease the rate at which the receiver is turned on, thereby preventing energy present in a fast leading edge from exciting the input of the receiver. The output of the receiver is adapted to be coupled to any variety of indicators, lights, bells, etc. to indicate the presence of the projectile in the zone 34.

In another embodiment of the present invention, the LC tuned resonant device was replaced with a cylindrical permanent magnet formed of a composition such as alnico. Similar permanent magnets formed of ceramic magnets containing barium ferrite, etc. may similarly be utilized. Such a device was then placed within a projectile and suitably implanted in an object to be detected. The device was then remotely detected by a suitable receiver sensitive to the magnetic fields produced by the magnet. Such receivers typically utilize detector coils, Hall probes or like sensors.

For purposes of simplicity, the discussion hereinabove has been restricted to the generation and detection of electromagnetic waves in a single direction. Inasmuch as the LC resonant circuit is essentially sensitive to such waves along only a single direction and since that direction cannot always be controlled, it is likewise desirable for many installations to provide an array of transmitting and receiving coils such as are disclosed in U.S. Pat. No. 3,697,996 (Elder & Wright) to facilitate detection of the projectile regardless of the orientation within the interrogation zone.

It is similarly within the scope of the present invention to position the transmitting and receiving coils about the interrogation zone in a variety of configurations such as are well known in the art. The transmitting and receiving coils may, for example, be opposing each other on opposite sides of the zone or may both be located adjacent each other on the same side of the zone.

Having thus described the present invention, what I claim is:

1. A projectile adapted to be shot toward and to threby be implanted into livestock such as cattle for thereafter enabling remote electromagnetic detection and identification of said livestock when they are in an interrogation zone, said projectile comprising a plastic body having outer dimensions including an external diameter of not greater than 0.3 inches (7.5 mm) and a length of not greater than 0.75 inches (19 mm), thereby enabling the non-lethal penetration of the projectile a short distance into said livestock and a passive electromagnetically responsive device sealed therewithin capable of providing an electromagnetic response to an external electromagnetic field to enable remote detection of said projectile.

2. A projectile according to claim 1, said body being formed of a material having a resistivity of not less than $10^6$ ohm-cm and a relative permeability of substantially unity such that electromagnetic fields will readily pass therethrough without appreciable attenuation.

3. A projectile according to claim 1 wherein said passive responsive device is resonant at a predetermined frequency.

4. A projectile according to claim 1 wherein said passive responsive device comprises an inductor-capacitor tuned circuit resonant at a predetermined frequency.

5. A projectile according to claim 1, having a cavity therewithin a portion of which encloses said electromagnetic device and another portion of which is adapted for containing material to be subsequently released therefrom, thereby enabling remote detection of an animal within which the projectile is implanted which is thus treated by the releasable material.

6. A projectile according to claim 5 wherein said cavity contains a biologically active material.

7. A projectile according to claim 5 wherein said cavity contains a releasable marking material.

8. A projectile adapted to be shot toward and to thereby be implanted into livestock such as cattle for thereafter enabling the remote electromagnetic detection and identification of said livestock when they are in an interrogation zone, said projectile comprising a plastic body having outer dimensions including an external diameter not greater than 0.3 inches (7.5 mm) and a length of not greater than 0.75 inches (19 mm), thereby enabling the non-lethal penetration of the projectile a short distance into said livestock and including a passive resonant device sealed within said body and having a predetermined resonant frequency capable of being stimulated into oscillations at said resonant frequency and of transmitting said oscillations in response to a change in an external electromagnetic field.

9. A projectile according to claim 8 wherein said resonant device comprises an inductor-capacitor tuned circuit.

10. A projectile according to claim 8 wherein said resonant device is capable of being stimulated into damped oscillations at said resonant frequency by a pulsed electromagnetic field.

11. An identification system for remotely tagging livestock such as cattle and for thereafter remotely electromagnetically detecting and identifying said livestock comprising a projectile including a plastic body having an external diameter of not greater than 0.3 inches (7.5 mm) and a length of not greater than 0.75 inches (19 mm), thereby enabling the non-lethal penetration of the projectile a short distance into said livestock and having sealed therein a passive electromagnetically responsive device capable of providing an electromagnetic response to an external electromagnetic field, means for propelling said projectile toward livestock to be tagged to cause it to be implanted therein, means for producing an electromagnetic field within an interrogation zone through which said tagged livestock may pass, and means for sensing an electromagnetic response whereby the said tagged livestock in the zone is detected and identified.

* * * * *

UNITED STATES PATENT AND TRADEMARK OFFICE
CERTIFICATE OF CORRECTION

PATENT NO. : 4,065,753
DATED : December 27, 1977
INVENTOR(S) : Fred R. Paul, Jr.

It is certified that error appears in the above-identified patent and that said Letters Patent are hereby corrected as shown below:

Column 1, line 19, change "3,292,808" to -- 3,292,080 --; and line 44, change "theobject" to -- the object --.

Column 4, line 18, change "hich" to -- which --.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*